Figure 1:
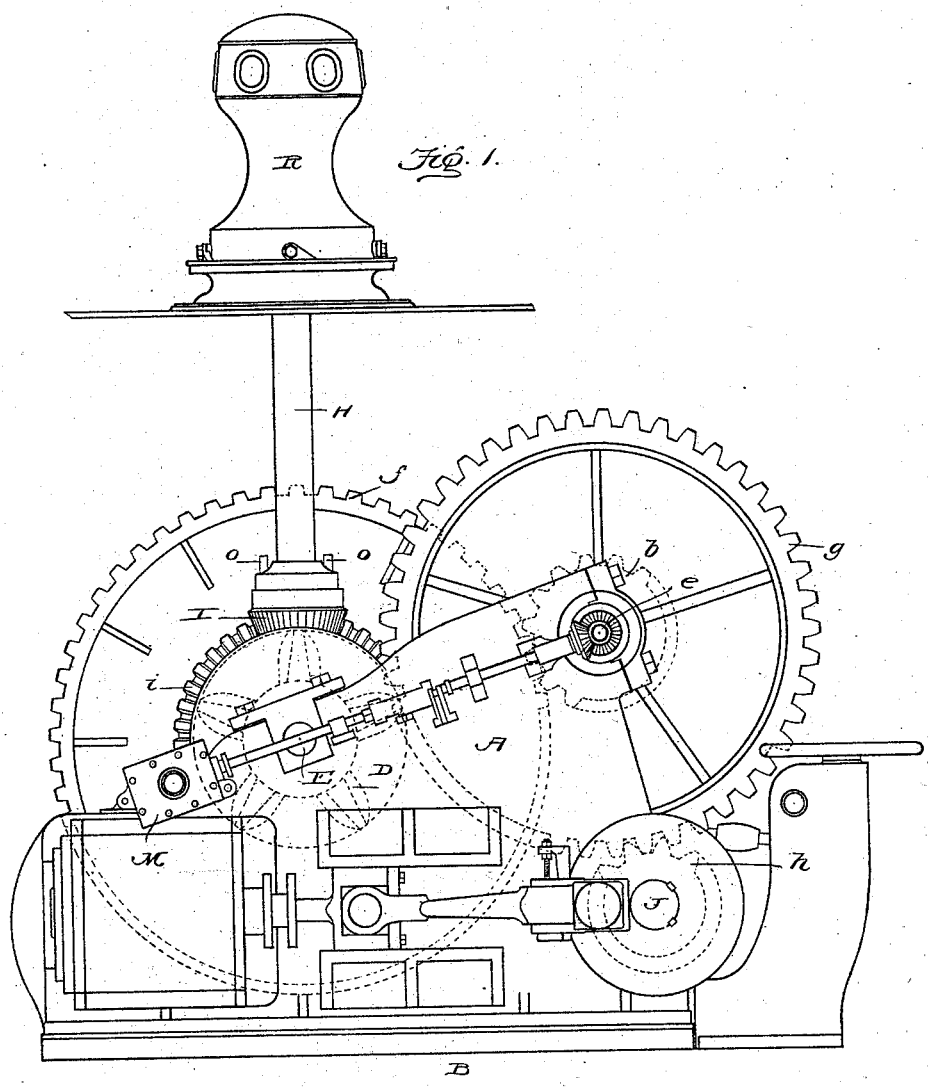

(No Model.) 6 Sheets—Sheet 1.

F. S. MANTON.
TOWING MACHINE.

No. 562,316. Patented June 16, 1896.

WITNESSES:

INVENTOR
Frank S. Manton

BY Edson Bro's,
ATTORNEYS.

(No Model.) 6 Sheets—Sheet 2.
F. S. MANTON.
TOWING MACHINE.
No. 562,316. Patented June 16, 1896.
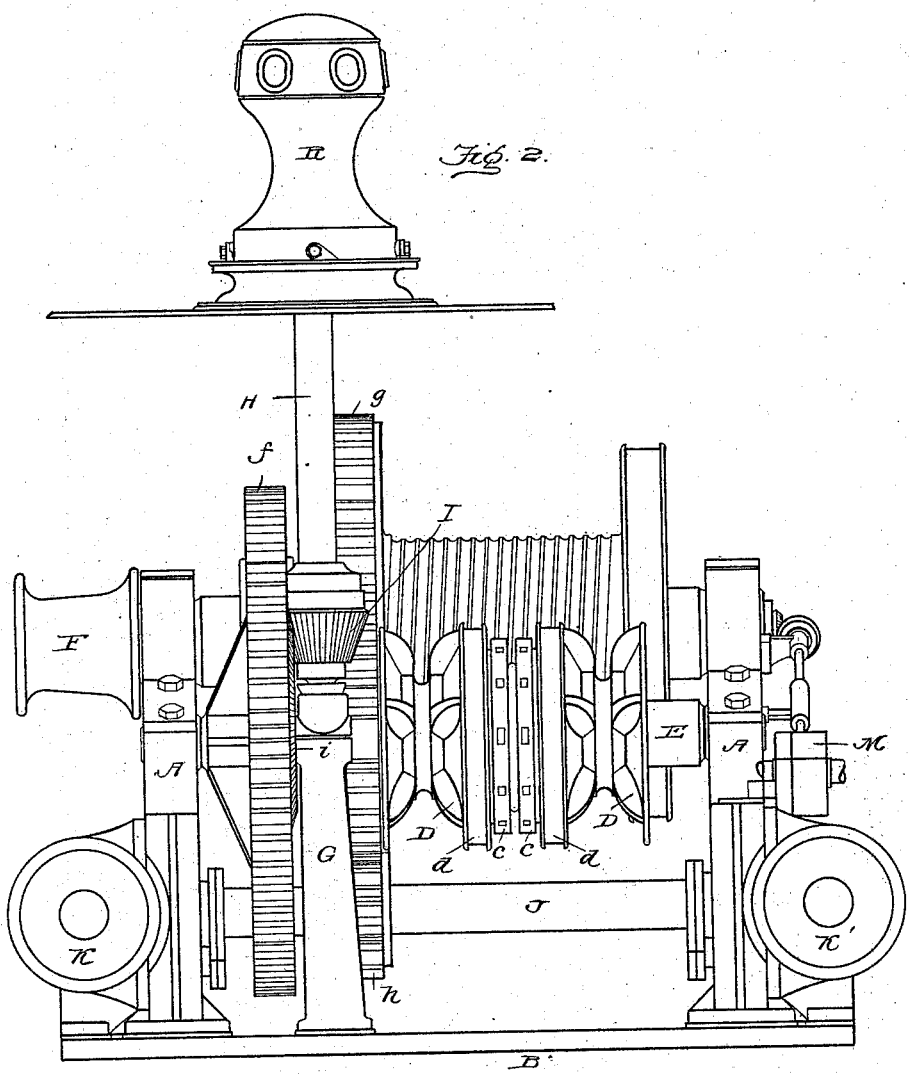
WITNESSES:
INVENTOR
Frank S. Manton
BY Edson Bro's
ATTORNEYS.

(No Model.)  6 Sheets—Sheet 3.
F. S. MANTON.
TOWING MACHINE.
No. 562,316. Patented June 16, 1896.
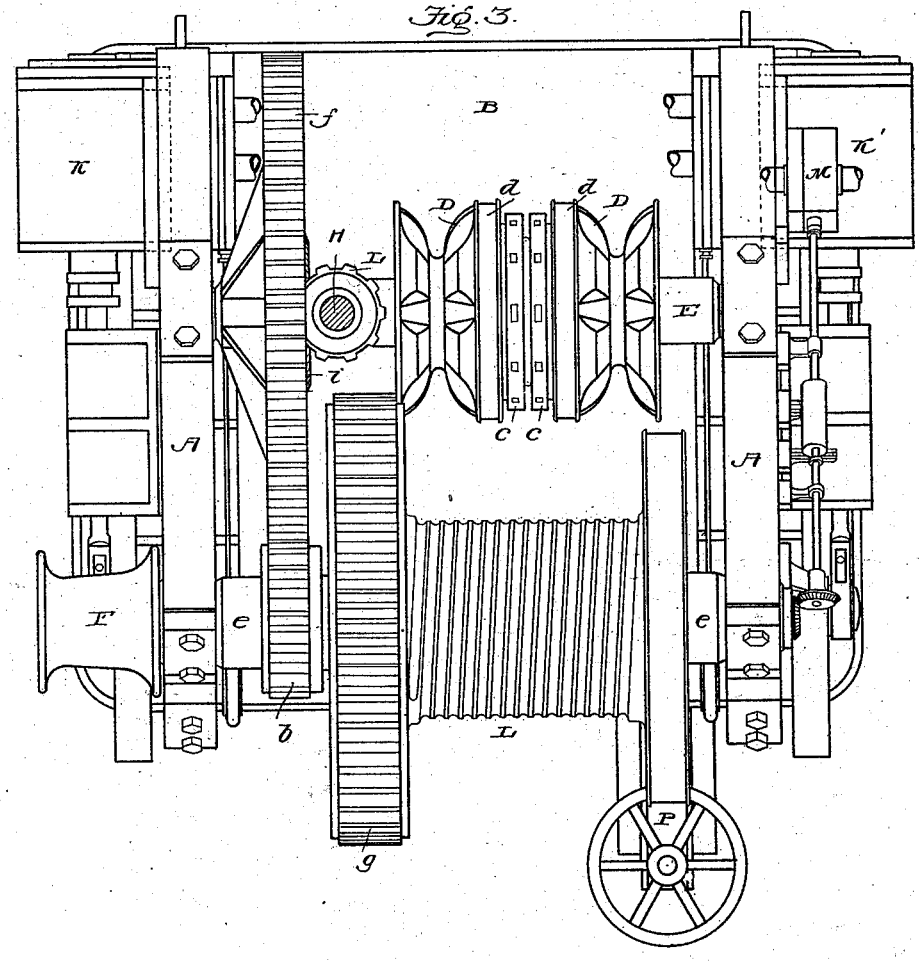
WITNESSES:
INVENTOR
Frank S. Manton
BY Edson Bros.
ATTORNEYS.

(No Model.) 6 Sheets—Sheet 4.
F. S. MANTON.
TOWING MACHINE.
No. 562,316. Patented June 16, 1896.
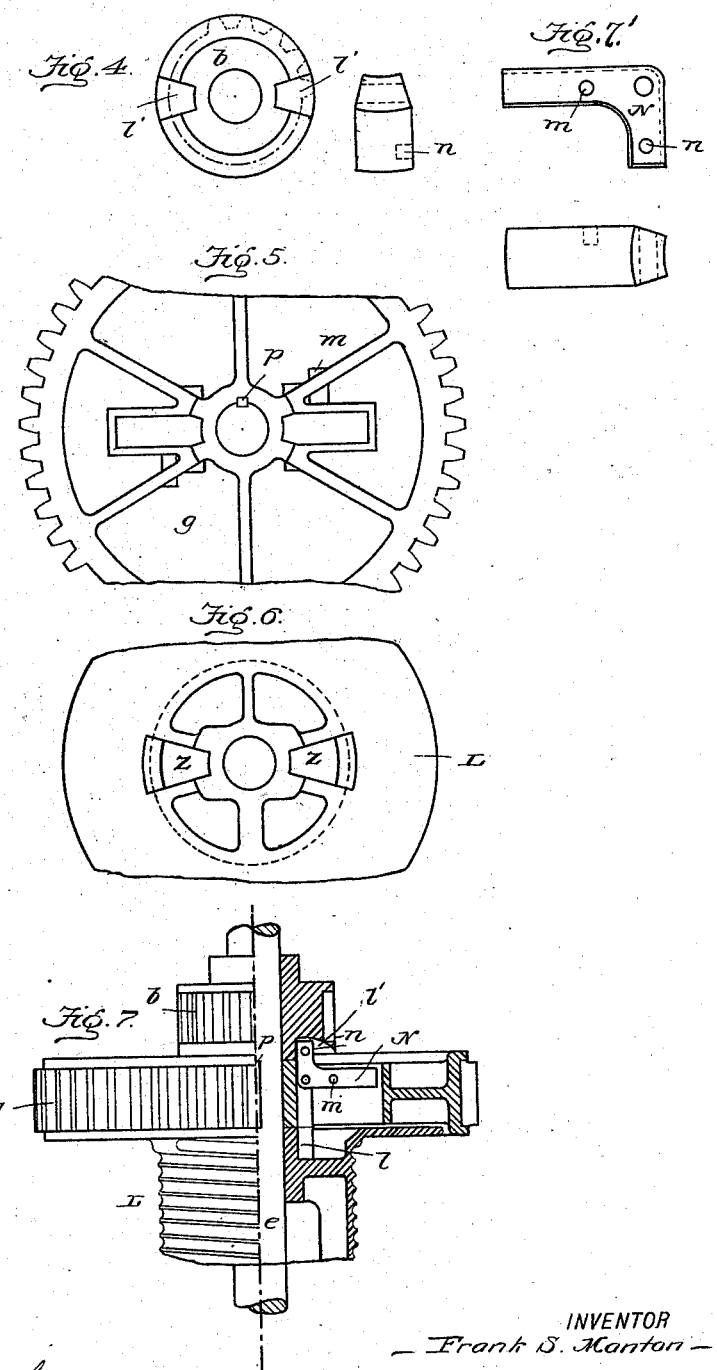

(No Model.) 6 Sheets—Sheet 5.

F. S. MANTON.
TOWING MACHINE.

No. 562,316. Patented June 16, 1896.

WITNESSES:

INVENTOR
Frank S. Manton.
BY Edson Bros,
ATTORNEYS.

(No Model.) 6 Sheets—Sheet 6.

F. S. MANTON.
TOWING MACHINE.

No. 562,316. Patented June 16, 1896.

Witnesses:

Frank S. Manton
Inventor:
by Edson Bros
Attys

UNITED STATES PATENT OFFICE.

FRANK S. MANTON, OF PROVIDENCE, RHODE ISLAND.

TOWING-MACHINE.

SPECIFICATION forming part of Letters Patent No. 562,316, dated June 16, 1896.

Application filed December 9, 1895. Serial No. 571,587. (No model.)

*To all whom it may concern:*

Be it known that I, FRANK S. MANTON, a citizen of the United States, residing at Providence, in the county of Providence and State of Rhode Island, have invented certain new and useful Improvements in Towing - Machines and Windlasses; and I do hereby declare the following to be a full, clear, and exact description of the invention, such as will enable others skilled in the art to which it appertains to make and use the same.

A towing-machine may be carried by either a towed or a towing vessel, but the vessel, whichever it may be, must also have a windlass to handle the anchor-chains, and very often has a capstan, and may also have a hoisting or warping winch.

Those familiar with the operation of towing-machines know that the sudden shocks and strains due to the action of a barge in a seaway are taken by the cylinders of the motor, the pressure being automatically regulated to balance the normal drag of the towed vessel. In case of sudden shocks, the hawser is paid out a little, and the action of unwinding the hawser from the drum opens the admission-valve still farther and increases the pressure in the cylinders until the strain is relieved or the power of the engine overcomes the pull on the hawser and the drum takes up rope again, and the admission-valve is automatically closed. On the other hand, when the windlass is used to enable the vessel to ride at anchor in a turbulent sea, the cable is subjected to sudden alternating degrees of tension, consequent upon the pitching and rolling of the vessel as it rides upon the waves or settles in the troughs of the sea, and the sudden strains on the cable are sometimes so enormous as to be beyond the endurance of the cable, which is therefore liable to be broken.

The object of my invention is mainly to enable the towing-machine and the windlass or the capstan of a vessel, or both of these, to be controlled by a motor, which is preferably a steam-engine, so that when the towing-machine is in use the yielding power of the motor acting upon it is increased or diminished according to the strain upon the hawser, and when the vessel is anchored the yielding power of the motor, acting upon the windlass or upon the capstan by which the cable is held in the vessel, is increased or diminished, according to the strain upon the cable, and consequently the cable is relieved of excessive strains when sudden shocks come upon it.

The motor which I prefer to use is a steam-engine with two steam-cylinders with reciprocating pistons coupled to the engine-shaft with their cranks at right angles with each other; and my invention consists of certain combinations of the motor or engine with other devices, as specified in the claims at the close of this specification. Some of these combinations may be used without the others.

A towing-machine alone must necessarily be provided with means for reversing the direction of motion of the drum, in order that the hawser may be paid out at the will of the operator to any desired length. A windlass, however, may be, and very often is, built without any means of running the chain-wheels backward by power, as the chain-wheels may be unlocked from the driving-heads and be free to turn loosely upon the shaft, and the weight of the anchors and chains will suffice to carry out the chains. It is nevertheless an advantage to provide means for lifting the chains from the lockers and for paying out under control of the windlass-engines, and I usually prefer to build my windlass with such a reversing mechanism.

In order that my invention may be fully understood, I have represented in the accompanying drawings, and will proceed to describe, an apparatus embodying my invention in the best form in which it has thus far been embodied for practical use, it being understood that the same may be varied to suit the views of different constructors or users, or whether my entire invention may be used or only a part or parts of it.

Figure 8:
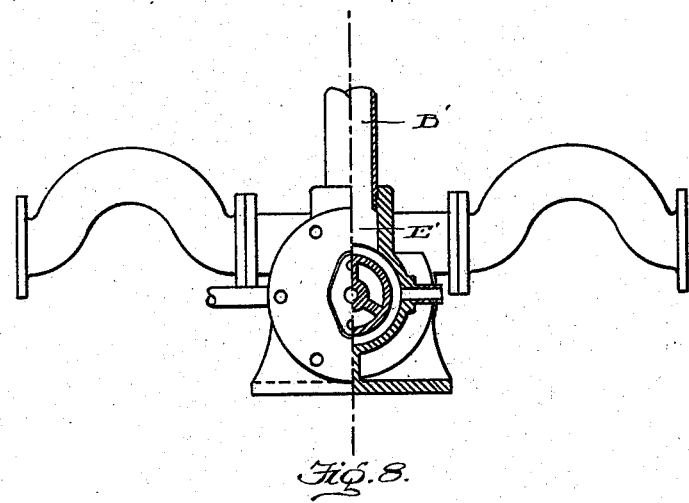
Figure 9:
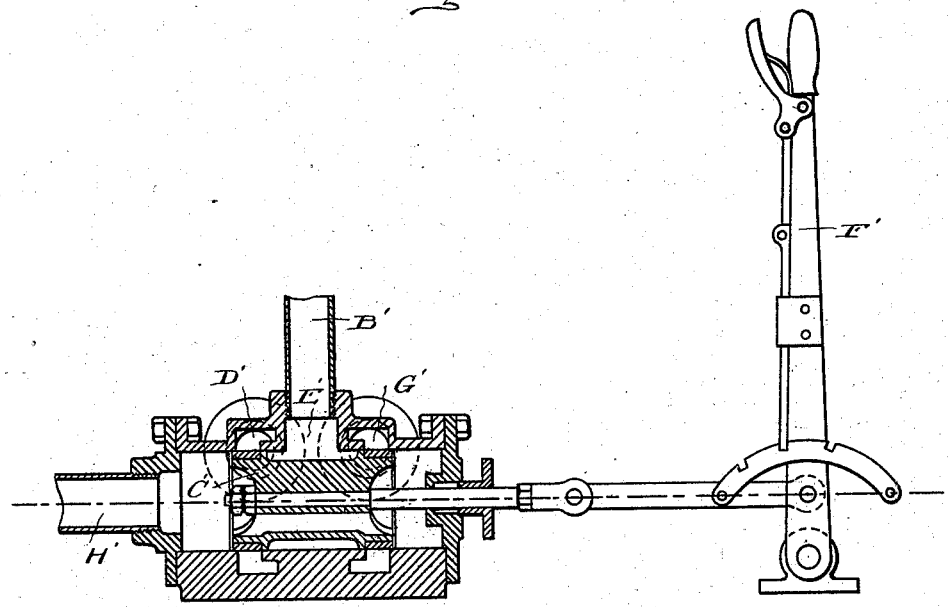
Figure 10:
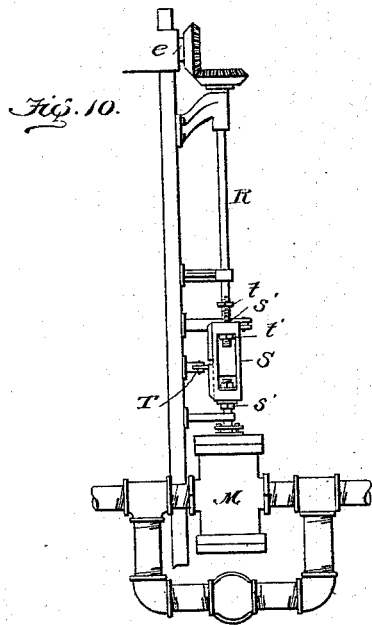
Figure 11:
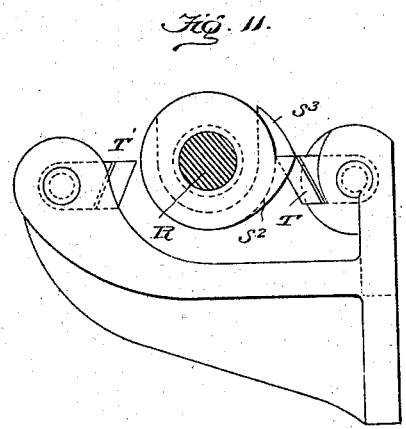
Figure 12:
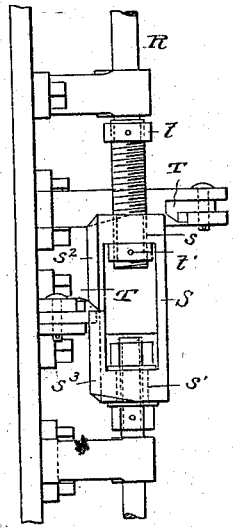
Figure 13:
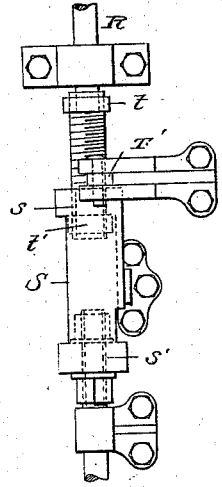

In the said drawings, Figure 1 represents a side view of a combined towing-machine, windlass, and capstan embodying my invention. Fig. 2 is an end view of the same, showing the location of the windlass and capstan and of the towing-drum. Fig. 3 is a plan view of the same. Fig. 4 is a plan view of a pinion on the drum-shaft. Fig. 5 is a plan view of a gear on the same shaft with the pinion. Fig. 6 is an end view of the towing-drum. Fig. 7 is a view, part in full and part in section, of Figs. 4, 5, and 6 in their respective positions on the drum-shaft. Fig. 7' shows the block-key detached. Figs. 8 and 9 are detail sectional elevations of parts of the reversing mechanism to be used in connection with the towing-machine for reversing the direction of motion of the towing-drum. Fig. 10 is a detail plan view of a suitable type of regulating-valve, screw-shaft, and connections therefor. Figs. 11, 12, and 13 are end view, plan, and side elevation, respectively, of the connecting-nut and sleeve forming part of the connections between the sections or members of the screw-shaft for operating the regulating-valve.

A A represent the side frames of the combined towing-machine and windlass. These frames are fastened to the base or bed-plate B. Any suitable construction of windlass may be employed. The one illustrated is designed to be driven either by hand or by engines. The locking-gear $c\ c$, which may be of any suitable construction, has wildcats or sprocket-wheels D mounted loosely upon the shaft E, and friction-bands, for which a groove is shown at $d$. The windlass may have the customary gypsy ends F either on the windlass-shaft E or, as shown in the drawings, on the drum-shaft $e$ of the towing-machine proper. The stand G supports the windlass-shaft E as well as the capstan-shaft H, which preferably extends upward through the deck above and carries thereon any suitable capstan. Such capstans are usually provided with means whereby they may be turned by hand, and therefore I prefer to construct the capstan-head with sockets for capstan-bars. The shaft H carries a bevel-pinion I, meshing with a bevel-gear $i$ on the windlass-shaft E. The bevel-pinion I is mounted loosely on the capstan-shaft H and provided with suitable clutch-key O or locking-gear, so that the capstan may be operated without moving the rest of the machine; or by throwing in the pawls or clutch-key O the windlass may be operated by hand. The windlass-shaft E carries a gear $f$, keyed or otherwise fastened, and meshing with a pinion $b$ on the drum-shaft $e$. The drum-shaft $e$ carries a gear $g$, which meshes with a pinion $h$ on the engine-shaft J, which is rotated by the engines K K'. These parts are all well known and do not need further description here, especially since they may be varied, or in part omitted, the specific kind of windlass used being immaterial to my invention.

The towing-machine, as shown in the drawings, has the well-known construction of reciprocating engines K K', constituting the motor, the shaft of which is geared to a drum L, on which the towing-hawser is wound, and has a pressure-regulating valve M located in the admission-passage to the engine cylinder or cylinders, and operatively connected with the shaft $e$ of the drum L.

In Figs. 10 to 13, inclusive, of the drawings I have illustrated one construction of the screw-shaft suitable for use as a means for operatively connecting the pressure-regulating valve M with the shaft $e$ of the towing-drum L. This construction is well known to those persons familiar with the building of steam towing-machines. The spindle or screw-shaft R is in two parts, connected by a nut and sleeve S, arranged at $s$ to fit a screw-thread on the shaft or spindle R, and at $s'$ to rotate about the said shaft or spindle R without turning the shaft. The portion of the shaft R between the bevel-gear and the sleeve or nut S simply rotates, the rotating and reciprocating of the nut and sleeve S depending upon their position with reference to the pawls T T'. The portion of the shaft or spindle R between the regulating-valve and the sleeve or nut reciprocates only. The nut or sleeve S is provided with two projections $s^2$ and $s^3$, which strike against or throw up (depending on the direction of rotation of the sleeve or nut S) two pawls T T'. These pawls prevent the nut S from revolving as long as they remain in contact with the projections $s^2$ or $s^3$, and compel said nut S to reciprocate and open or close the valve M. At nearly the end of motion of the valve M in either direction, the projections $s^2$ or $s^3$ move beyond the limits of contact with the pawls T and T' and S is free to revolve. The two collars $t$ and $t'$, fixed on the shaft or spindle R, soon bind on the nut S and compel said nut to revolve, thus limiting the reciprocating motion in either direction.

The reversing mechanism to change the direction of rotation of the engine may be of any suitable or well-known form, but the mechanism which I prefer to use is the well-known form of the reverse-valve. (Shown in Figs. 8 and 9.) The steam enters through the pipe B' into the space E'. According as the plug C' is moved by the handle F' to one end or the other of the valve-chamber, the steam is admitted to the cylinders either through the pipes G' and exhausted from the cylinders through the pipes D' and from the valve through H', or else admitted through D' and exhausted through G' and H'. This mechanism is familiar to those skilled in the art of manufacturing both steam windlasses and towing-machines. The pipes D' and G' are preferably curved, as shown, to admit of expansion and contraction.

The details of a towing-machine proper are too well known to need detailed description. Hence I shall only describe those parts which practically relate to my invention.

The main gear $g$, Fig. 7, may be mounted loosely on the same shaft; also the pinion $b$ may be mounted loosely on shaft $e$. The gear $g$ holds a block-key N, Fig. 8, and the drum L and the pinion $b$ each has a dovetail recess $l\ l'$ to receive the block-key N.

In locking the gear $g$ to the pinion $b$ the block-key N is held in position by a suitable pin $m$, Fig. 5, fitting into the block-key N, Fig. 7. When the gear $g$ is locked with the drum L, the pin *m* fits into the aperture *n* in the block-key N. It will be understood that I do not limit my invention to this form of locking, as any well-known form may be used that will accomplish the same result.

In the operation of this machine as a towing-machine, the block-key N, Fig. 7, is thrown into position to lock the drum L to its gear *g*, thus throwing out the pinion *b*, which is mounted loosely on the shaft *e*, operating the towing-machine without running the windlass or capstan. When operating the windlass or capstan by the engine, the block-key N is thrown into position to lock with the pinion *b*, thus working the windlass or capstan without moving the towing-machine drum L. As shown in the drawings, the drum L is loose on its shaft, and, by a suitable form of locking device, is fastened to its gear only when used in towing. Hence it can be entirely disconnected from the windlass or capstan when the windlass or capstan is used; or, otherwise, the drum L may be keyed securely to the drum-shaft and also to its gear *g*, and the end of the towing rope or cable may be temporarily secured to some other device, so that the drum may always revolve when the other parts of the machine are in use for their special purposes. If the capstan is operated by hand-power, the bevel-pinion I is disconnected from the rest of the machine by raising the clutch-key O, as shown in the drawings, or any other well-known form of locking device may be used. In operating the windlass by hand the clutch-key O is dropped into the socket made to receive it in the bevel-pinion I, and thus drives the windlass.

The towing-machine as usually constructed is supplied with a friction-band P, Fig. 3, and in calm water it may often be economical and convenient to disconnect the engines and tow with the strain upon the friction-band. It then becomes desirable to provide means by which the towing-hawser may be lengthened or shortened by hand-power, or at times the hawser cast off by the consort vessel may profitably be wound upon the drum by hand. The apparatus described and represented permits such action. Thus when it is desirable to revolve the drum of the towing-machine by hand-power, the locking device formed by the clutch-key O, Fig. 1, is dropped into the socket in the bevel-pinion I, which drives the bevel-gear *i*, and with it the gear *f*, meshing into pinion *b*, which is locked with block-key N to the gear *g* and to the drum L of the towing-machine. The capstan is thereby coupled to the towing-machine so that the turning of the capstan R by the capstan-bars turns the drum of the towing-machine.

If the vessel be at anchor in a turbulent sea, and it be desirable to take the shock of the waves upon the cylinder or cylinders, the pull of the chains will be transmitted from the wildcats D and their locking-heads *c* through the gear *f* and the pinion *b* to the drum-shaft *e*, the block-key N being in mesh with the pinion *b*, and back through the gear *g* and the pinion *h* to the crank-shaft and cylinder or cylinders.

The form of automatic gear shown in the drawings is well known, but the invention is not limited to any particular form of gearing; and the ordinary chain-grabs or other well-known means of holding the cables may be used in place of the wildcats above described.

Having thus described a combined towing-machine embodying my invention, what I claim as new, and desire to secure by Letters Patent, is—

1. The combination, substantially as before set forth, of a ship's windlass for handling the anchor-chains, with a towing-machine having its engines geared to said windlass-shaft, and a pressure-regulator for controlling the steam-pressure in the cylinders of said engines and operatively connected with the towing-drum shaft, thereby enabling the windlass to be operated by the towing-machine engines.

2. The combination, substantially as before set forth, of a ship's windlass, a towing-machine having a drum for the towing-line and provided with means for connecting and disconnecting the towing-drum to and from its engine, an automatic pressure-regulator located in the admission-passage to the engine, means for regulating said pressure-regulator, and gearing, whereby the strain upon the cable, when the ship is riding at anchor, may be taken upon the engine cylinder or cylinders, so as automatically to pay out cable when a sudden shock comes upon it, and to take it up again when the strain is relieved.

3. The combination, substantially as before set forth, of a ship's windlass, an engine, the shaft of which is geared to said windlass, a pressure-regulating valve, located in the admission-passage to the engine, and a capstan, with means for operatively connecting the same with the engine-shaft, whereby both the windlass and capstan are operated by the same engine under the control of the pressure-regulating valve.

4. The combination, substantially as set forth, of the drum for the towing-hawser, a windlass, a capstan for operating said windlass by hand, an engine, the shaft of which is geared to said windlass, a pressure-regulating valve, and gearing and locking devices whereby the towing-drum may be operated by hand or by the engine.

5. The combination, substantially as set forth, of the drum for the towing-hawser, a ship's windlass, an engine geared to said windlass, a capstan, an automatic pressure-regulating valve, a reversing mechanism to change the direction of rotation of the engine, and a gypsy end or head whereby hoisting or warping may be effected by the same engine which controls the windlass with a yielding power.

6. The combination with a towing-machine, the engines of which are connected to the towing-drum shaft and are controlled by a pressure-regulating valve, of a capstan, and gearing and locking devices for connecting the capstan to, and disconnecting the same from, the drum-shaft of the towing-machine, substantially as and for the purposes described.

7. The combination with a towing-machine, the engines of which are connected to the towing-drum shaft and are controlled by a pressure-regulating valve, of a windlass, gearing between the windlass-shaft and the drum-shaft of the towing-machine, a capstan geared to the windlass-shaft, and means for connecting and disconnecting the windlass-shaft to and from the drum-shaft of the towing-machine.

8. The combination of a towing-machine, the engines of which are controlled by a pressure-regulating valve operatively connected with the towing-drum shaft, a ship's windlass arranged close to and substantially parallel with the drum-shaft of said towing-machine, and gearing and locking devices between the windlass-shaft and the drum-shaft for connecting and disconnecting the engine-shaft and said windlass-shaft, substantially as and for the purposes set forth.

9. The combination with a towing-machine having a loose drum, and an engine-shaft, of driving-gears on said towing-drum shaft, provided with means for locking them together or for locking one gear to the towing-drum, and a windlass geared to one of said driving-gears, substantially as and for the purposes described.

10. The combination with a towing-machine having a loose drum, a windlass, and an engine-shaft, of driving-gears loosely mounted on the towing-drum shaft, one of which gears is connected with the engine-shaft and the other with the windlass-shaft, and means for locking the driving-gears together or for locking one of said gears to the towing-drum, substantially as and for the purposes described.

11. The combination with a towing-drum shaft carrying a loose drum, a windlass, and an engine-shaft, of driving-gears $b$, $g$, loosely mounted on said towing-drum shaft and meshing, respectively, with the engine-shaft and the windlass-shaft, and a locking-key reversibly fitted in said gear $g$ to engage with the gear $b$ or with the towing-drum, substantially as and for the purposes described.

12. The combination of a towing-machine, the engines of which are controlled by a pressure-regulating valve operatively connected with the towing-drum shaft, a ship's windlass arranged alongside of and substantially parallel to the towing-drum shaft, a capstan having gearing and locking devices for connecting the capstan-shaft to the windlass-shaft, and gearing and locking devices for connecting and disconnecting the windlass-shaft through the towing-drum shaft with the engines of said towing-machine, substantially as and for the purposes described.

In testimony whereof I affix my signature in presence of two witnesses.

FRANK S. MANTON.

Witnesses:
GILMAN E. JOPP,
GEORGE S. LINCOLN.